H. C. Smith,
Cutting Shingles.
Nº 10,709.                    Patented Mar. 28, 1854.
Fig. 1.
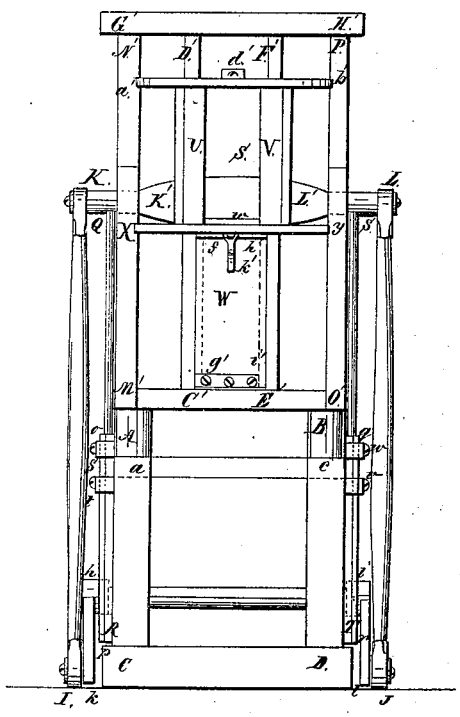
Fig. 2.
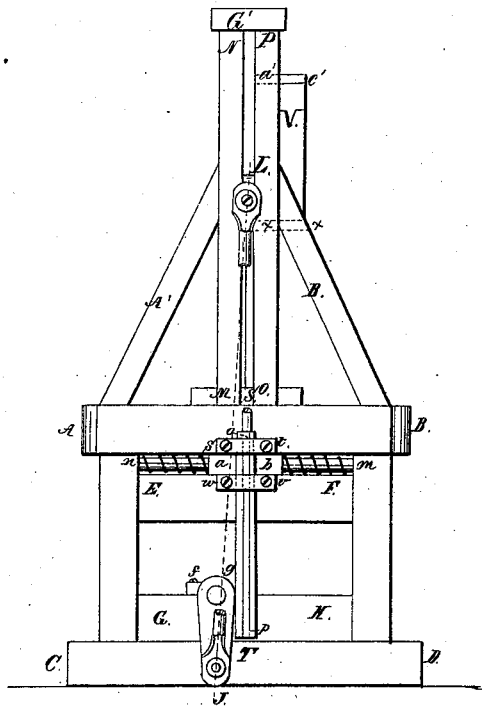
Fig. 4.
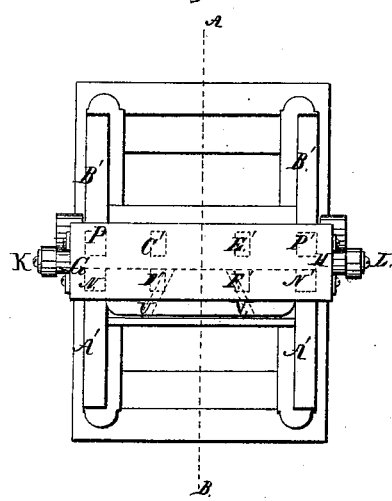
Fig. 3.
Fig. 5.
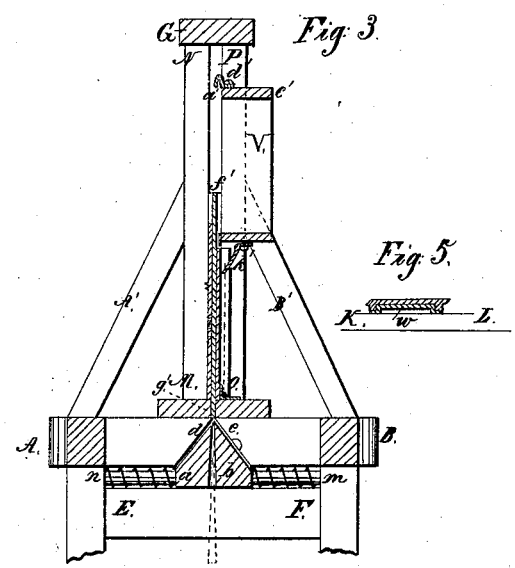
AM. PHOTO-LITHO. CO. N.Y. (OSBORNE'S PROCESS)

UNITED STATES PATENT OFFICE.

HENRY C. SMITH, OF CLEVELAND, OHIO.

CONSTRUCTION OF SHINGLE-MACHINES.

Specification of Letters Patent No. 10,709, dated March 28, 1854.

*To all whom it may concern:*

Be it known that I, HENRY C. SMITH, of Cleveland, in the county of Cuyahoga and State of Ohio, have invented a new and useful Improvement in the Construction of Shingle-Machines; and I do hereby declare that the following is a full and exact description of the same, reference being had to the annexed drawings, making part of this specification.

The nature of my invention consists in riving from the block a shingle bolt in such manner that it will fall by its own weight into a receptacle, where by a peculiar contrivance hereinafter described it is submitted to the action of two shaving knives at the same time, one on each side, the proper distance between said knives being regulated by means of two sliding wedges in the manner hereinafter described.

To enable others skilled in the art to make and use my invention I will proceed to describe its construction and operation.

Figure 1 is a front and Fig. 2 is a side elevation of the entire machine, Fig. 3 represents an end view of a portion of the top part of the frame. Fig. 4 is a view looking directly down on the top of the frame, the line A. B. being in the direction A. B. Fig. 2. Fig. 5 represents the riving knife as attached to the sliding bar.

The machine consists of a substantial framework base A. B. C. D. Figs. 1 and 2, of suitable size and strength, upon which is erected a lighter framework M. N. O. P. Figs. 2 and 3, M' N' O' P', Fig. 1, the tops of which are shown at N. P. and N'. P', Fig. 4. This framework is strengthened by the braces A.' B', Figs. 2. 3. and 4. Within this framework are four smaller studs, two of which are represented by C' D' E' F' Fig. 1, and the tops of all four by C' D' E' F' Fig. 4. A substantial top G. H, Figs. 1 and 4, seen endwise at G', Figs. 2 and 3, connects this framework together. Near the upper part of the framework base are two sliding bars the ends of which are shown at *a* and *b*, Fig. 2, and one of them at *a c*, Fig. 1. These sliding bars each has a knife attached to it somewhat more in length than the widest shingle it is intended to cut, as shown endwise at *d* and *e*, Fig. 3, where *a b* represents the sliding bars. These sliding bars move between the underside of the top part of the frame A, B, Figs. 2 and 3, and the top of another piece E, F, Figs. 2 and 3, mortised into the frame at the two sides, as shown in Figs. 2 and 3. At the lower part of the frame at each side another similar cross piece G, H, is mortised on each side, as shown in Fig. 2. Boxes are attached to these cross pieces, one of which is partly shown at *f*, *g*, Fig. 2, in which a shaft shown by *h*, *i*, Fig. 1, revolves. Two cranks shown at *h*, *k*, and *i*, *l*, Fig. 1, are attached to the ends of this shaft, These cranks are a little longer than the length of a shingle. Two side rods I, K, and I, L, Fig. 1, one of which is also shown at I, L, Fig. 2, and the tops of both at K, L, Fig. 4, are moved up and down by means of the cranks, carrying with them the cross piece K, L, Fig. 1, which moves between the stout upright bars M, N, O, P, Figs. 2 and 3, which are firmly mortised and braced into the lower framework A, B, C, D, as has been described. The middle part of the sliding piece K, L, is made broad and flat as shown in Fig. 1, K' L', for the purpose of attaching the riving knife and presenting a flat surface to the bolt to be rived. Attached to this cross piece K, L, Fig. 1, are two sliding rods Q, R, and S, T, Fig. 1, one of which is partially shown at S, T, Fig. 2. The lower parts of these rods are made wedge shaped, as represented by S, T, Fig. 2, the lower end T, being the larger, so that by sliding between the cross pieces to which the shaving knives are bolted, two ends of which pieces are shown at *a*, *b*, Fig. 2, these knives are made to recede from each other, or to approach, as the case may be, the ends of the pieces to which they are bolted being firmly pressed against the sides of the wedge shaped sliding rods by means of strong spiral springs, shown at *b*, *m*, and *a*, *n*, Figs. 2 and 3. To insure a parallel motion of the sliding rods Q, R, and S, T, Fig. 1, and S, T, Fig. 2, there is a projection *o*, *p*, and *q*, *r*, Fig. 1, and *o p*, Fig. 2, which slides in corresponding guides *s*, *t*, and *u*, *v*, Figs. 1 and 2, these guides being bolted to the frame work A, B, and E, F, Fig. 2.

To the lower part of the cross piece K, L, Fig. 1, is attached a knife *w*, Fig. 1, shown more plainly in Fig. 5, where K, L, represents a portion of the sliding bar and *w*, represents the knife. This knife projects forward the thickness of a shingle say $\frac{1}{3}$ of an inch, the cutting edge being upward. This knife is so situated that its cutting edge is just below the cross piece *x*, *y*, Fig. 1, when depressed to its lowest point, which however is not exactly shown in the drawing, the knife *w*, being represented as above the cross piece *x*, *y*. The cross piece *x*, *y*, Fig. 1 is shown endwise by the dotted lines *x*, *z*, Fig. 2, and constitutes the bottom of a hopper the sloping sides of which are represented by U, V, Figs. 1 and 4, and one of them at V, Figs. 2 and 3, being a little more in height than the length of a shingle. The top of this hopper is shown by *a'*, *b'*, Fig. 1, and endwise at *a' e'*, Figs. 2 and 3. Into this hopper the shingle block is placed and held firm, so that when the cross piece K', L', Fig. 1, is made to rise by the revolution of the shaft *h*, *i*, Fig. 1, by means of the cranks attached to it, a shingle is rived from the block by the knife *w*, Fig. 1. As this shingle would stick between the knife *w*, Fig. 1, and the flat part of the cross piece K', L', to which it is attached, there is a curved piece of iron shown at *d'*, Figs. 3 and 1, attached to the top of the hopper, which by slipping between the knife *w*, and the cross piece K', L', when this cross piece has arrived to its utmost height, forces out the shingle, which immediately falls by its own weight into a receptacle below, and directly above the shaving knives. This receptacle is some 4 inches deeper than the length of a shingle and of just sufficient thickness to allow the shingle to fall freely into it. It is closed in front by a door W, Fig. 1, moving on hinges at the lower part, and is so arranged that it is partially opened or thrown forward at the top when the cross piece K, L, Fig. 1, is at its highest point, and just when the curved iron piece *d'*, Figs. 1 and 3, has forced the rived shingle from between the knife *w*, and the cross piece K' L', Fig. 1, thus permitting the shingle to enter the receptacle more easily. This door is thus opened by means of two studs attached to the lower part of a sliding plate, this plate being of just such size as to fill said receptacle when the cross piece K, L, Fig. 1, to which it is attached, is depressed to its lowest point. This sliding plate is represented by the dotted lines *f' g' h' i'*, Fig. 1, and *f' g'*, Fig. 3, as seen endwise. When the sliding piece K, L, Fig. 1, is raised, the plate *f' g' i' h'* is raised with it, and also the studs which are attached at the lower part near *g' i'*, (not shown in the drawing,) which studs run in grooves cut on the inside of the door W, and having at the top wedge shaped pieces placed so that when the studs meet them the door is thrown forward sufficient to allow the shingle to fall down into the receptacle, and below the bottom of the sliding plate *g' i'*, Fig. 1. When the cross piece K, L, Fig. 1, begins to descend the studs attached to the sliding plate leaving the wedge shaped pieces at the top of the door, the door is thrown back by a strong spring *k'*, Figs. 1 and 3. In this position the rived shingle is immediately under the sliding plate *f' g' i' h'*, Fig. 1, ready to be forced between the shaving knives by the descent of this plate. At this time, the sliding rods Q, R, S, T, Fig. 1, being nearly in their highest position, the shaving knives are necessarily the farthest apart. As the sliding piece K, L, Fig. 1, descends bringing down with it the sliding rods Q, R, S, T, Fig. 1, also the sliding plate *f' g' h' i'*, Fig. 1, the rived shingle is forced between the shaving knives, which are gradually caused to approximate by the action of the spiral springs *n*, *a*, and *b*, *m*, Figs. 2 and 3, which force the sliding bars that hold these knives closely against the sloping sides of the sliding rods, the sliding plate *f' g' h' i'*, Fig. 1, descending close to the top of the shaving knives, as is represented in Fig. 3, where *f' g'* is an end view of this sliding plate and *d*, *e*, the shaving knives. The shingle is thus forced completely through, and drops below. Again by the ascent of the sliding piece K, L, Fig. 1, another shingle is rived and by its descent is shaved in the manner already described.

I do not claim any one of the separate devices shown hereinbefore; but

What I do claim as my invention and desire to secure by Letters Patent, is—

The special and precise arrangement and the mode of operating the devices as hereinbefore set forth.

HENRY C. SMITH.

Witnesses:
HAMILTON L. SMITH,
S. S. BARRY.